(12) United States Patent
Katukam et al.

(10) Patent No.: US 12,483,440 B2
(45) Date of Patent: Nov. 25, 2025

(54) METHODS AND SYSTEMS FOR NETWORK SEGMENTATION

(71) Applicant: NILE GLOBAL, INC., San Jose, CA (US)

(72) Inventors: Suresh Katukam, Milpitas, CA (US); Promode Nedungadi, San Jose, CA (US); Shiv Mehra, Saratoga, CA (US); Steve Alexander, Woodside, CA (US)

(73) Assignee: NILE GLOBAL, INC., San Jose, CA (US)

( * ) Notice: Subject to any disclaimer, the term of this patent is extended or adjusted under 35 U.S.C. 154(b) by 0 days.

(21) Appl. No.: 18/689,010

(22) PCT Filed: Aug. 31, 2022

(86) PCT No.: PCT/US2022/042235
§ 371 (c)(1),
(2) Date: Mar. 4, 2024

(87) PCT Pub. No.: WO2023/034434
PCT Pub. Date: Mar. 9, 2023

(65) Prior Publication Data
US 2025/0132953 A1    Apr. 24, 2025

(51) Int. Cl.
*H04L 12/46* (2006.01)
*H04L 9/40* (2022.01)
(52) U.S. Cl.
CPC ...... *H04L 12/4641* (2013.01); *H04L 12/4633* (2013.01); *H04L 63/029* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 8,428,087 B1 * | 4/2013 | Vincent | H04L 47/2483 709/236 |
| 10,382,401 B1 * | 8/2019 | Lee | H04L 63/166 |
| 10,609,016 B2 | 3/2020 | Goeringer et al. | |

(Continued)

FOREIGN PATENT DOCUMENTS

EP    3888307 B1 *    8/2024    ......... H04L 12/4641

OTHER PUBLICATIONS

PCT/US2022/042235, International Search Report, Jan. 10, 2023, 14 pgs.

(Continued)

*Primary Examiner* — Phyllis A Book
(74) *Attorney, Agent, or Firm* — LOZA & LOZA LLP

(57) ABSTRACT

Embodiments of a device and method are disclosed. In an embodiment, a method for network segmentation of a network deployed at a customer site involves establishing a tunnel between a network device of the network deployed at the customer site and a network port of a switch of the network deployed at the customer site, when a wired device is plugged into the network port of the switch, transmitting network traffic between the wired device and the network device through the tunnel, facilitating a security operation regarding the wired device, and based on a result of the security operation, performing a network segmentation operation regarding the wired device.

13 Claims, 9 Drawing Sheets

(56) References Cited

U.S. PATENT DOCUMENTS

| | | | |
|---|---|---|---|
| 11,095,610 B2 | 8/2021 | Gilbert et al. | |
| 11,343,226 B2* | 5/2022 | Goeringer | H04L 63/20 |
| 2009/0122990 A1 | 5/2009 | Gundavelli et al. | |
| 2016/0028626 A1 | 1/2016 | Koganti | |
| 2016/0255456 A1 | 9/2016 | Lee et al. | |
| 2016/0351043 A1 | 12/2016 | Tabe | |
| 2017/0034051 A1 | 2/2017 | Chanda et al. | |
| 2017/0230281 A1* | 8/2017 | Newell | H04L 12/4641 |
| 2020/0092254 A1* | 3/2020 | Goeringer | H04L 45/46 |
| 2020/0162589 A1* | 5/2020 | Vijayadharan | H04W 24/04 |
| 2020/0177503 A1* | 6/2020 | Hooda | H04L 12/4641 |
| 2020/0322274 A1 | 10/2020 | Copley | |
| 2020/0389469 A1 | 12/2020 | Litichever et al. | |
| 2021/0176158 A1 | 6/2021 | Soh et al. | |
| 2021/0367920 A1* | 11/2021 | Devarajan | H04L 63/166 |
| 2022/0131898 A1* | 4/2022 | Hooda | H04L 47/746 |
| 2022/0182317 A1* | 6/2022 | Thoria | H04L 12/4641 |
| 2022/0182359 A1* | 6/2022 | Devaraj | H04L 63/0876 |
| 2023/0421478 A1* | 12/2023 | Chhabra | H04L 63/0272 |

OTHER PUBLICATIONS

Non-Final Office Action (U.S. Appl. No. 17/465,767) dated Mar. 9, 2023, 27 pgs.

Final Office Action (U.S. Appl. No. 17/465,767) dated Jun. 15, 2023, 17 pgs.

Notice of Allowance (U.S. Appl. No. 17/465,767) dated Aug. 28, 2023, 8 pgs.

* cited by examiner

METHODS AND SYSTEMS FOR NETWORK SEGMENTATION

BACKGROUND

Network segmentation plays an important role in ensuring that network designs and/or deployments meet customer requirements. For example, network segmentation technology can be used to divide a network into multiple segments or subnets, e.g., to improve network performance and/or or enhance network security. Each segment or subnet of a network can act as its own small network, which allows flow of traffic between subnets to be controlled based on granular policies or rules. Typically, network segmentation of a network is performed by configuring virtual local area networks (VLANs) on physical ports of a physical switch in the network, which are mapped to corresponding VLANs. However, because VANs are configured on physical ports of a physical switch, a specific network device may need to be plugged into a corresponding network port (e.g., a wired port) of the physical switch, which is mapped to an appropriate VLAN. Therefore, there is a need for network segmentation technology that can provide a network segmentation process that does not rely on port configuration for different devices and allows network devices to be plugged into any network port.

SUMMARY

Embodiments of a device and method are disclosed. In an embodiment, a method for network segmentation of a network deployed at a customer site involves establishing a tunnel between a network device of the network deployed at the customer site and a network port of a switch of the network deployed at the customer site, when a wired device is plugged into the network port of the switch, transmitting network traffic between the wired device and the network device through the tunnel, facilitating a security operation regarding the wired device, and based on a result of the security operation, performing a network segmentation operation regarding the wired device. Other embodiments are also described.

In an embodiment, the tunnel includes a Generic Routing Encapsulation (GRE) tunnel or a Virtual Extensible Local Area Network (VXLAN).

In an embodiment, establishing the tunnel between the network device of the network deployed at the customer site and the network port of the switch of the network deployed at the customer site includes establishing a plurality of tunnels between the network device and a plurality of network ports of the switch, wherein the tunnels are separate from each other.

In an embodiment, no tunnel is shared by multiple ports of the switch.

In an embodiment, facilitating the security operation regarding the wired device includes facilitating an authentication operation regarding the wired device through the network device.

In an embodiment, facilitating the authentication operation regarding the wired device through the network device includes authenticating the wired device with an authentication server through the network device.

In an embodiment, based on the result of the security operation, performing the network segmentation operation regarding the wired device includes when the authentication server rejects an authentication request of the wired device, not allowing the wired device to join the network and receive a network segmentation configuration.

In an embodiment, based on the result of the security operation, performing the network segmentation operation regarding the wired device includes when the authentication server does not reject an authentication request of the wired device, allowing the wired device to join the network and receive a network segmentation configuration.

In an embodiment, facilitating the authentication operation regarding the wired device through the network device further includes when the authentication server does not reject an authentication request of the wired device, determining whether or not the authentication server sends a network segment name for the wired device.

In an embodiment, based on the result of the security operation, performing the network segmentation operation regarding the wired device includes when it is determined that the authentication server does not send the network segment name for the wired device, not allowing the wired device to join the network and receive a network segmentation configuration.

In an embodiment, performing the authentication operation regarding the wired device through the network device further includes when it is determined that the authentication server sends the network segment name for the wired device, determining whether or not the network segment name for the wired device is valid.

In an embodiment, based on the result of the security operation, performing the network segmentation operation regarding the wired device includes when it is determined that the network segment name for the wired device is valid, assigning the wired device to a network segment of the network deployed at the customer site that corresponds to the network segment name.

In an embodiment, the wired device supports an authentication protocol or standard.

In an embodiment, facilitating the authentication operation regarding the wired device through the network device includes checking the wired device against a network segmentation database.

In an embodiment, based on the result of the security operation, performing the network segmentation operation regarding the wired device includes when it is determined that the wired device matches an entry within the network segmentation database, assigning the wired device to a corresponding network segment of the network deployed at the customer site and when it is determined that the wired device does not match any entry within the network segmentation database, not allowing the wired device to join the network and receive a network segmentation configuration.

In an embodiment, the wired device does not support any authentication protocol or standard.

In an embodiment, the network device includes a head end (HE) or a gateway device.

In an embodiment, a system for network segmentation of a network deployed at a customer site includes memory and one or more processors configured to establish a tunnel between a network device of the network deployed at the customer site and a network port of a switch of the network deployed at the customer site, when a wired device is plugged into the network port of the switch, transmit network traffic between the wired device and the network device through the tunnel, facilitate a security operation regarding the wired device, and based on a result of the security operation, perform a network segmentation operation regarding the wired device.

In an embodiment, the tunnel includes a GRE tunnel or a VXLAN.

In an embodiment, a method for network segmentation of a network deployed at a customer site involves establishing GRE tunnels between a gateway device of the network deployed at the customer site and network ports of a switch of the network deployed at the customer site, when wired devices are plugged into the network ports of the switch, transmitting network traffic between the wired devices and the gateway device through the GRE tunnels, facilitating a security operation regarding the wired devices through the gateway device, and based on a result of the security operation, performing a network segmentation operation regarding the wired devices using the gateway device.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
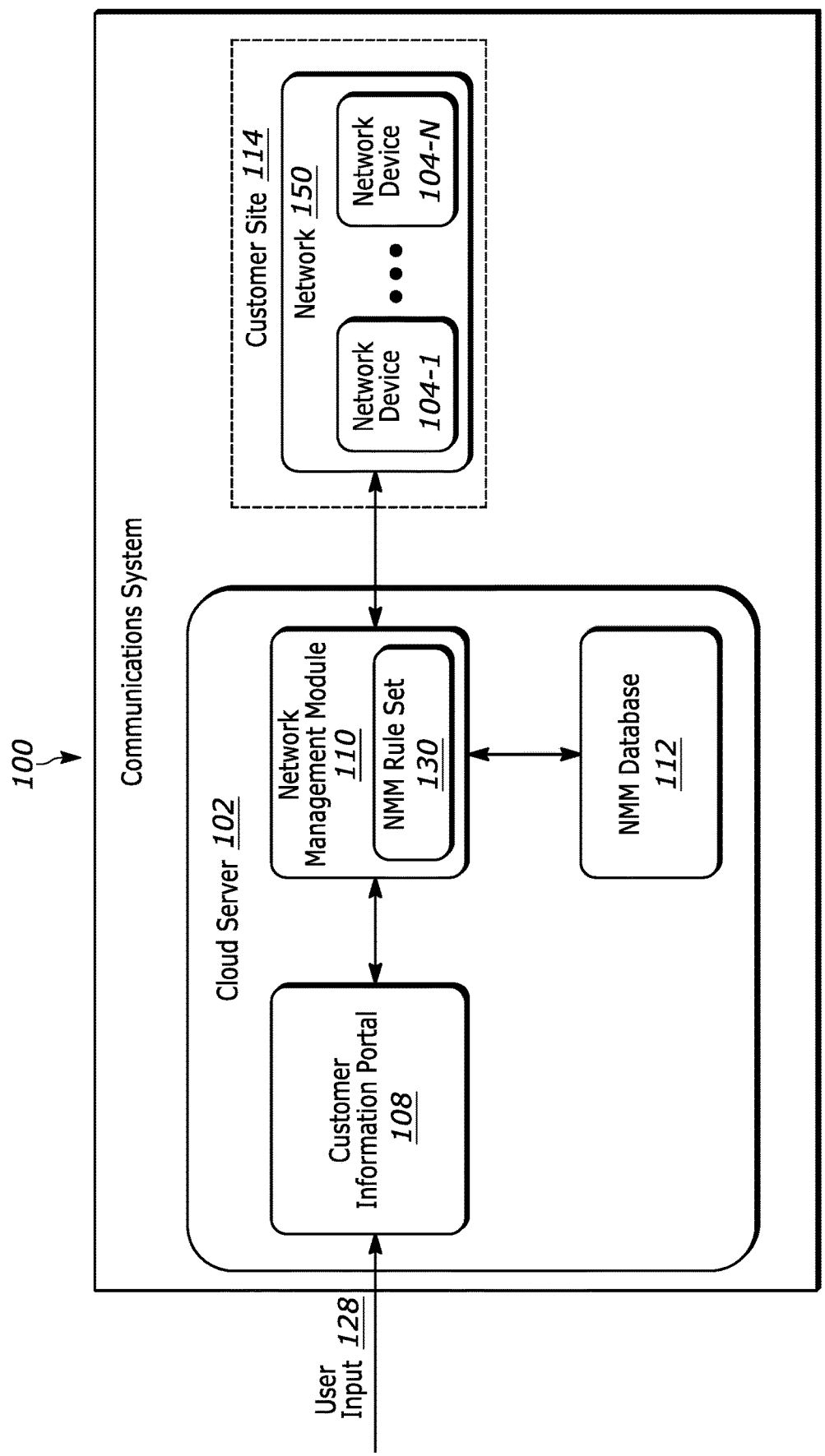
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and a deployed network 150 within a customer site 114. The cloud server and/or the network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a network management service (e.g., a network segmentation service) to network devices (e.g., the deployed network 150) at the customer site. In some embodiments, the cloud server is configured to divide the deployed network 150 into multiple segments or subnets, e.g., to improve network performance and/or or enhance network security. Each segment or subnet of the deployed network may act as its own small network, which allows flow of traffic between subnets to be controlled based on one or more network segmentation policies or rules. Because the cloud server can facilitate or perform a network segmentation service or operation for network devices at the customer site, network segmentation efficiency can be improved. In some embodiments, the cloud server is configured to generate a user interface to obtain input information, for example, a floor plan of a customer site. In some embodiments, the user interface includes a graphical user interface. The cloud server may be implemented in hardware (e.g., circuits), software, firmware, or a combination thereof. In some embodiments, the cloud server is hosted or executed in a public cloud computing environment such as Amazon Web Services (AWS), and/or a private cloud computing environment such as an enterprise cloud server. In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes a network management module (NMM) 110, a customer information portal 108 connected to the NMM module 110, and an NMM database 112 configured to store NMM data. The NMM module, the customer information portal, and/or the NMM database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one NMM module, more than one customer information portal, and/or more than one NMM database. In another example, although the NMM module, the customer information portal, and the NMM database are shown in FIG. 1 as being connected in a certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server. In some embodiments, the NMM module 110 is configured to facilitate or perform an NMM service (e.g., a network segmentation service) to network devices (e.g., the deployed network 150) at the customer site 114, for example, using an NMM rule set 130. The NMM rule set 130 may include one or more NMM rules (e.g., network segmentation rules) for network devices at the customer site 114, for example, for performing an NMM service (e.g., network segmentation) to network devices at the customer site 114. In some embodiments, the NMM module 110 is configured to is configured to divide the deployed network 150 into multiple segments or subnets, e.g., to improve network performance and/or or enhance network security. Each segment or subnet of the deployed network may act as its own small network, which allows flow of traffic between subnets to be controlled based on one or more network segmentation policies or rules. In some embodiments, the NMM module 110 is configured to generate and/or transmit at least one alert (e.g., a network segmentation alert or error) regarding a network deployed and/or to be deployed at the customer site or a network operator site, for example, to an administrator or a user or customer (e.g., a layperson such as a worker on-site or an end-user such as an employee) at the customer site 114. In some embodiments, the NMM database 112 is configured to store NMM data for a network deployed and/or to be deployed at the customer site (e.g., a list of network devices deployed or to be deployed at the customer site). In some embodiments, the NMM database 112 is configured to store the at least one NMM alert. Because the NMM module can facilitate or perform network segmentation for network devices at the customer site, network segmentation efficiency can be improved. In addition, because the NMM deployment module can facilitate or perform a network segmentation service or operation for network devices at the customer site, an administrator or a customer can be notified of network conditions. Consequently, network outage or low performance time can be shortened. The customer information portal 108 is configured to receive user input 128. In some embodiments, the customer information portal is configured to include or generate a user interface that allows a customer to input information related to the customer site 114 (e.g., the floor plan of the customer site 114) and/or information associated with an NMM service (e.g., a network segmentation service) for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the one or more network devices 104-1, . . . , 104-N is compatible with Institute of Electrical and Electronics Engineers (IEEE) 802.3 protocol and/or one or more wireless local area network (WLAN) communications protocols, such as IEEE 802.11 protocol. In some embodiments, at least one of the one or more network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the one or more network devices 104-1, . . . , 104-N is a wireless station (STA) that wirelessly connects to a wireless AP. For example, at least one of the one or more network devices 104-1, . . . , 104-N may be a laptop, a desktop personal computer (PC), a mobile phone, or other wireless device that supports at least one WLAN communications protocol (e.g., an IEEE 802.11 protocol)).

Figure 2:
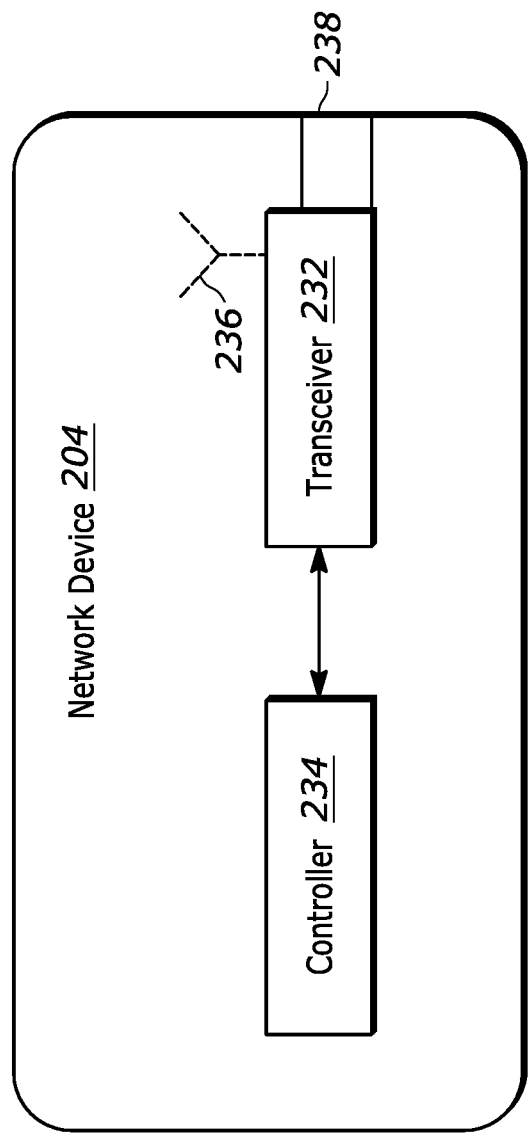
FIG. 2 depicts an embodiment of a network device of the communications system depicted in FIG. 1.

FIG. 2 depicts an embodiment of a network device 204 of the communications system depicted in FIG. 1. The network device 204 may be an embodiment of a network device that is included in the deployed network 150 depicted in FIG. 1. However, network devices that can be included in the deployed network 150 depicted in FIG. 1 are not limited to the embodiment depicted in FIG. 2. The network device 204 may be any suitable type of network device. For example, the network device 204 may be a distribution switch, a gateway, an access switch, a wireless access point, or a sensor, described in more detail with reference to FIG. 3. In some embodiments, the network device 204 is a wired device. In some embodiments, the network device 204 is a wireless device. In some embodiments, the network device 204 is a wired device with wireless capability, for example, a wireless access point. In the embodiment depicted in FIG. 2, a network device 204 includes a wired and/or wireless transceiver 232, a controller 234 operably connected to the transceiver 232, at least one optional antenna 236 operably connected to the transceiver 232, and at least one network port 238 operably connected to the transceiver 232. In some embodiments, the transceiver 232 includes a physical layer (PHY) device. In some embodiments, the at least one network port 238 is optional and is not included. The transceiver 232 may be any suitable type of transceiver. For example, the transceiver 232 may be a short-range communications transceiver (e.g., a Bluetooth transceiver) or a WLAN transceiver (e.g., a transceiver compatible with an IEEE 802.11 protocol). In some embodiments, the network device 204 includes multiple transceivers, for example, a short-range communications transceiver (e.g., a Bluetooth transceiver) and a WLAN transceiver (e.g., a transceiver compatible with an IEEE 802.11 protocol). In some embodiments, the network device (e.g., a wireless AP) includes multiple antennas and multiple wireless transceivers that share the antennas. In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to obtain and/or store network information relevant to the network device 204. For example, the controller 234 may be configured to obtain and/or store network information (e.g., routing information such as a routing table) relevant to the network device 204. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. In some embodiments, the network device 204 is a DS, a HE or gateway, an AS, a wireless AP, or a wireless sensor that wirelessly connects to a wireless AP.

Figure 3:
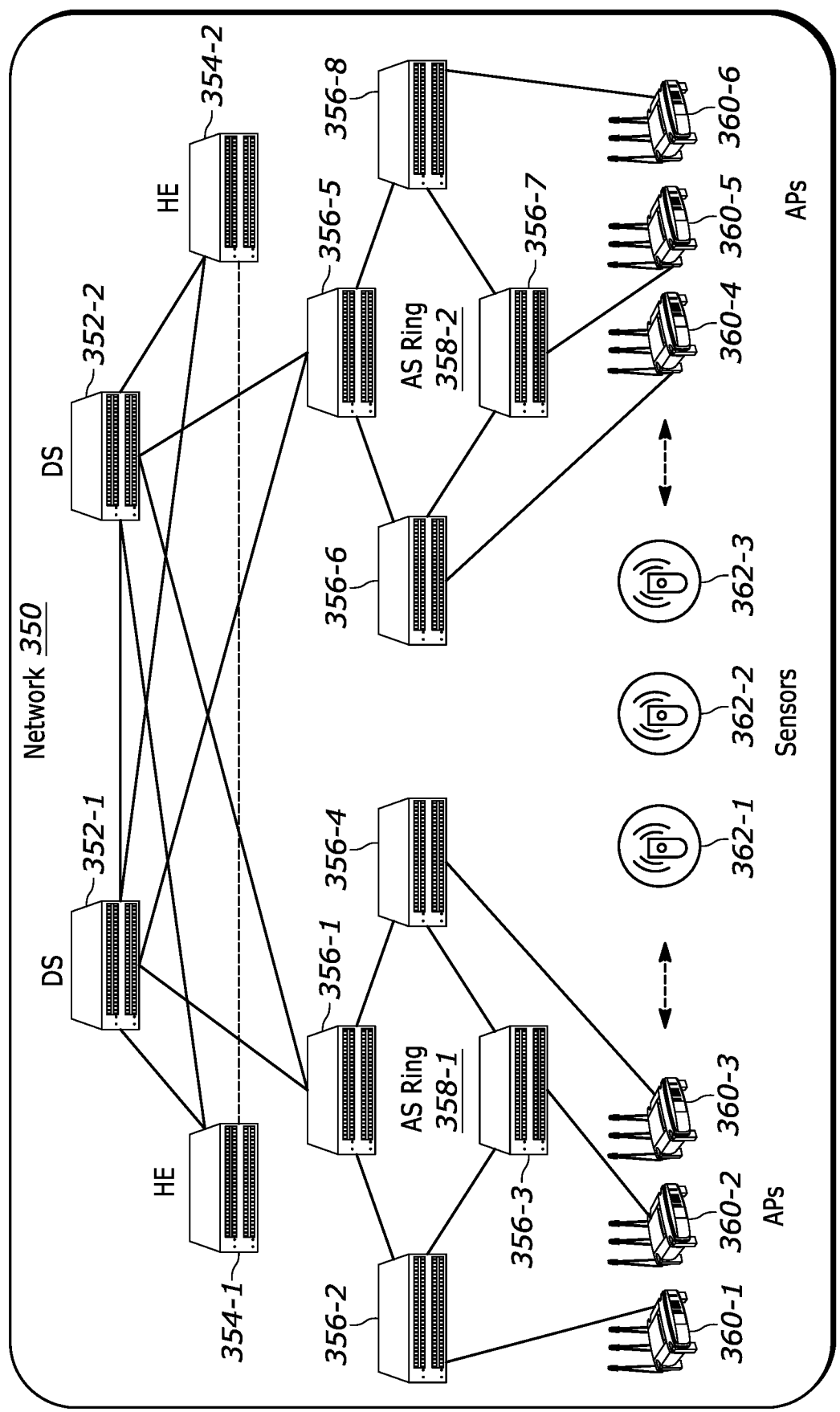
FIG. 3 depicts an embodiment of a network that can be deployed at a customer site.

FIG. 3 depicts an embodiment of a network 350 that can be deployed at the customer site 114. The network 350 depicted in FIG. 3 is one possible embodiment of the deployed network 150 at the customer site 114 depicted in FIG. 1. However, the deployed network 150 at the customer site 114 depicted in FIG. 1 is not limited to the embodiment shown in FIG. 3. In some embodiments, the network 350 is a basic building block for providing connectivity as a service and is a replicable block that can be scaled (e.g., expanded) to meet any deployment need. In the embodiment depicted in FIG. 3, the network 350 includes a pair of distribution switches (DSs) or distribution layer switches 352-1, 352-2 that are aggregation switches functioning as a bridge between core layer switches and access layer switches, a pair of head ends (HEs) or gateways 354-1, 354-2, a number of optional access switches (ASs) 356-1, 356-2, 356-3, 356-4, 356-5, 356-6, 356-7, 356-8 connected in rings 358-1, 358-2 that can interact with lower level devices (e.g., wireless APs), a number of wireless APs 360-1, 360-2, 360-3, 360-4, 360-5, 360-6 connected to the ASs, and a number of wireless sensors 362-1, 362-2, 362-3 that wirelessly connect to the wireless APs and are configured to measure and monitor network information at the customer site 114. In some embodiments, the network 350 does not include access switches and the wireless APs are directly connected to the DS 352-1 and/or the DS 352-2. In some embodiments, at least one of the DSs 352-1, 352-2, the HEs 354-1, 354-2, the ASs 356-1, 356-2, 356-3, 356-4, 356-5, 356-6, 356-7, 356-8, the wireless APs 360-1, 360-2, 360-3, 360-4, 360-5, 360-6, and the wireless sensors 362-1, 362-2, 362-3 depicted in FIG. 3 is implemented as the network device 204 depicted in FIG. 2. In some embodiments, at least one additional network device, such as a laptop, a desktop PC, or a mobile phone, that can be used by at least one user (e.g., an employee, a guest, or a partner), is included in the network 350.

Figure 4:
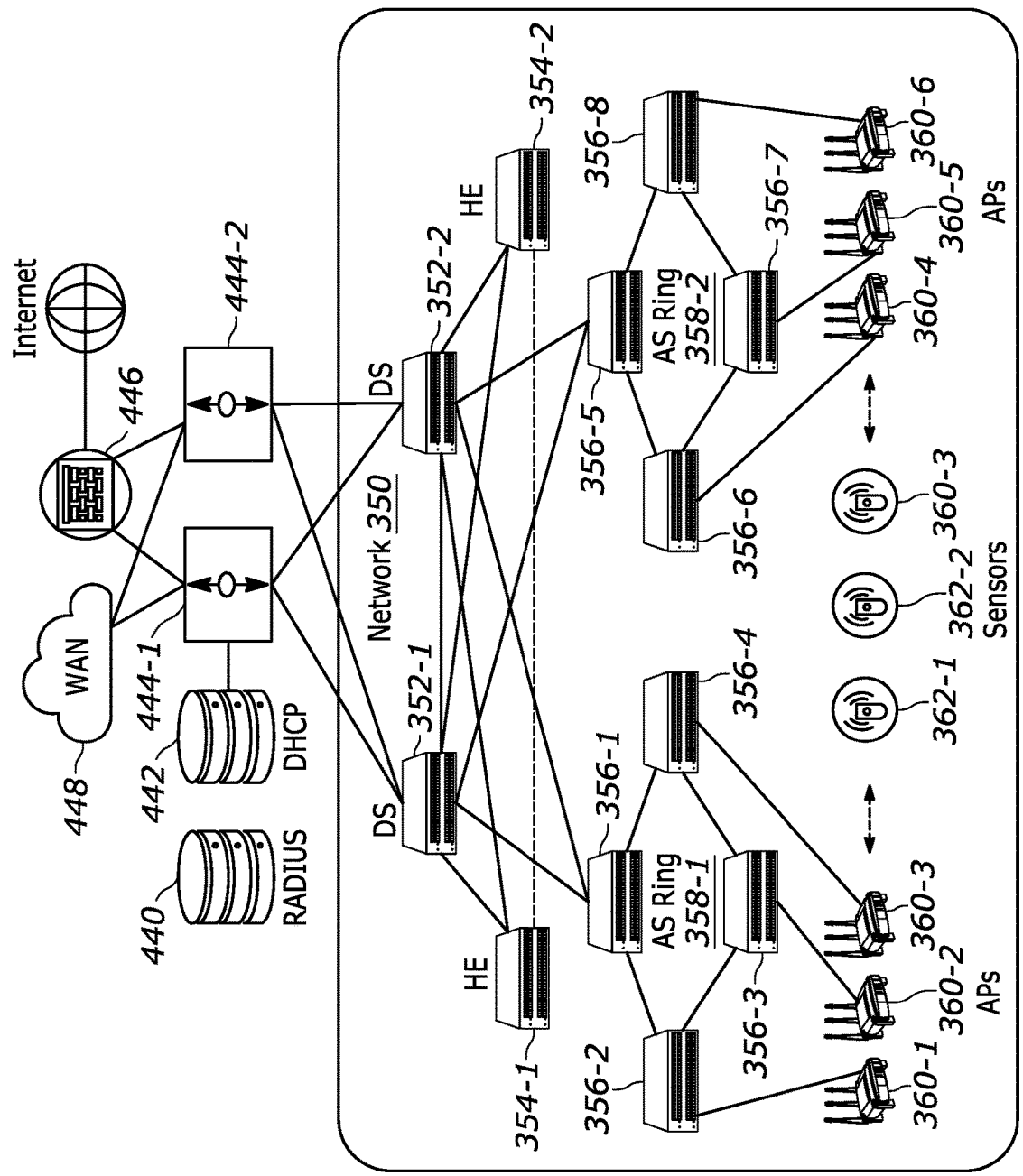
FIG. 4 depicts the network depicted in FIG. 3 connected to other network elements.

FIG. 4 depicts the network 350 depicted in FIG. 3 connected to other network elements, such as an authentication server (e.g., a Remote Authentication Dial-In User Service (RADIUS) server) 440, a Dynamic Host Configuration Protocol (DHCP) server 442, switches 444-1, 444-2, a firewall 446, and a wide area network (WAN) 448. In the embodiment depicted in FIG. 4, the DSs 352-1, 352-2 of the network 350 are connected to the switches 444-1, 444-2, which are connected to the authentication server 440 or the DHCP server 442, the firewall 446, and the WAN 448. The firewall 446 may be connected to a public network, e.g., the Internet.

In some embodiments, to perform network segmentation of a network deployed at a customer site, a tunnel is established between a network device of the network deployed at the customer site and a network port of a switch of the network deployed at the customer site, and when a wired device is plugged into the network port of the switch, network traffic is transmitted between the wired device and the network device through the tunnel. A security operation regarding the wired device is performed, for example, through the network device, and based on a result of the security operation, a network segmentation operation regarding the wired device is facilitated, for example, using the network device. Examples of the security operation include, without being limited to, an authentication operation and a verification operation, for example, by checking or matching the wired device with entries in a network segmentation database. In some embodiments, at least one of the security operation and the network segmentation operation is transmitted through the tunnel. The tunnel may include a Generic Routing Encapsulation (GRE) tunnel and/or a Virtual Extensible Local Area Network (VXLAN). In some embodiments, multiple tunnels are established between the network device and network ports of the switch, where the tunnels are separate from each other. In some embodiments, no tunnel is shared by multiple ports of the switch. Although GRE tunnels and VXLAN tunnels are described as two types of tunnels, other types of tunnels and/or tunneling protocols, including for example Network Virtualization using GRE (NVGRE) and IP Security (IPSec), may be used.

In some embodiments, a system for network segmentation of a network deployed at a customer site includes memory and one or more processors configured to establish a tunnel between a network device of the network deployed at the customer site and a network port of a switch of the network deployed at the customer site, when a wired device is plugged into the network port of the switch, transmit network traffic between the wired device and the network device through the tunnel, facilitate a security operation (e.g., an authentication operation or a verification operation, for example, by checking or matching the wired device with entries in a network segmentation database) regarding the wired device, and based on a result of the security operation, perform a network segmentation operation regarding the wired device. In some embodiments, at least one of the security operation and the network segmentation operation is transmitted through the tunnel. In some embodiments, the tunnel includes a GRE tunnel and/or a VXLAN). In some embodiments, the system includes a HE or a gateway device, for example, one or more of the HEs 354-1, 354-2 depicted in FIG. 3. In some embodiments, the one or more processors are configured to establish multiple tunnels between the network device and network ports of the switch, where the tunnels are separate from each other. In some embodiments, no tunnel is shared by multiple ports of the switch. In some embodiments, the wired device supports an authentication protocol or standard, and the one or more processors are configured to, when the authentication server rejects an authentication request of the wired device, do not allow the wired device to join the network and receive a network segmentation configuration. In some embodiments, the one or more processors are configured to, when the authentication server does not reject an authentication request of the wired device, allow the wired device is to join the network and receive a network segmentation configuration. In some embodiments, the one or more processors are configured to, when the authentication server does not reject an authentication request of the wired device, determine whether or not the authentication server sends a network segment name for the wired device. In some embodiments, the one or more processors are configured to, when it is determined that the authentication server does not send the network segment name for the wired device, do not allow the wired device to join the network and receive a network segmentation configuration. In some embodiments, the one or more processors are configured to, when it is determined that the authentication server sends the network segment name for the wired device, determine whether or not the network segment name for the wired device is valid, for example. In some embodiments, the one or more processors are configured to, when it is determined that the network segment name for the wired device is valid, assign the wired device to a network segment of the network deployed at the customer site that corresponds to the network segment name. In some embodiments, the wired device does not support any authentication protocol or standard and the one or more processors are configured to check the wired device against a network segmentation database. In some embodiments, the one or more processors are configured to, when it is determined that the wired device matches an entry within the network segmentation database, assign the wired device to a corresponding network segment of the network deployed at the customer site, and when it is determined that the wired device does not match any entry within the network segmentation database, do not allow the wired device to join the network and receive a network segmentation configuration.

Figure 5:
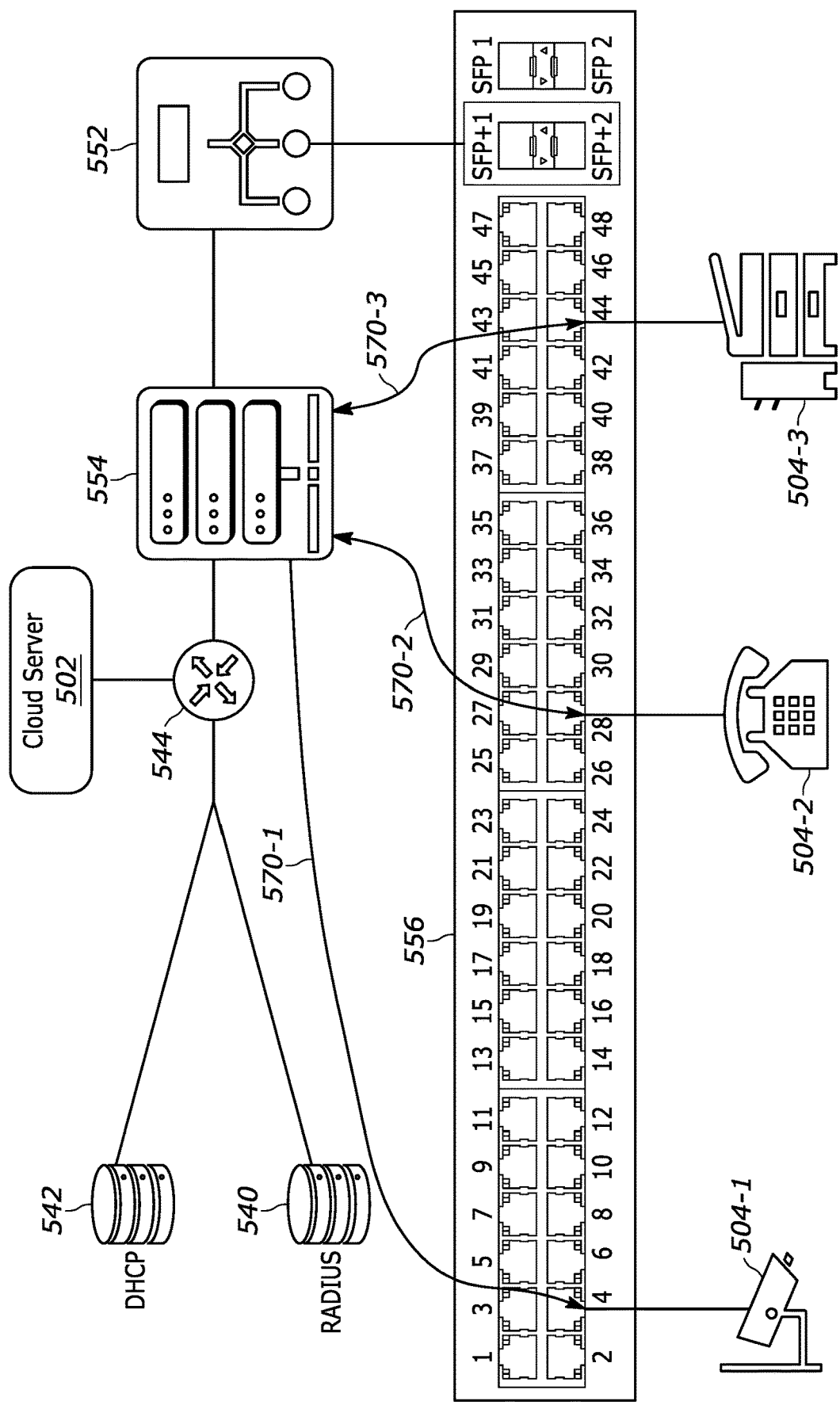
FIG. 5 depicts an interaction of a switch with at least one distribution switch (DS), at least one head end (HE), a network element, an authentication server, a DHCP server, and/or a cloud server to perform network segmentation.

FIG. 5 depicts an interaction of a switch 556 with at least one DS 552, at least one HE 554, a network element (e.g., a router 544), an authentication server (e.g., a RADIUS server) 540, a DHCP server 542, and/or a cloud server 502 to perform network segmentation. The switch 556, the at least one DS 552, and the at least one HE 554 depicted in FIG. 5 may be similar to or the same as the ASs 356-1, 356-2, 356-3, 356-4, 356-5, 356-6, 356-7, 356-8, the DSs 352-1, 352-2, and the HEs 354-1, 354-2 depicted in FIG. 3, respectively. The authentication server 540 and the DHCP server 542 depicted in FIG. 5 may be similar to or the same as the authentication server 440 and the DHCP server 442 depicted in FIG. 4, respectively. The cloud server 502 depicted in FIG. 5 may be similar to or the same as the cloud server 102 depicted in FIG. 1. In some embodiments, at least one of the authentication server 540 and the DHCP server 542 is implemented within the cloud server 502. As depicted in FIG. 5, the switch 556 is connected to network devices 504-1, 504-2, 504-3 through wired connections, for example, at port 4, port 28, and port 44 of the switch 556, respectively. The network devices 504-1, 504-2, 504-3 may be implemented as a camera, a network telephone, and a network printer, respectively. However, the network devices 504-1, 504-2, 504-3 are not limited the examples above. In addition, the number of network devices that are connected to the switch are not limited to the example shown in FIG. 5. For example, the number of network devices that are connected to the switch may be less than three or greater than three (but equal to or smaller than the total number of ports (e.g., forty-eight in the example shown in FIG. 5)). Although the switch 556 is shown in FIG. 5 as having forty-eight ports for connecting to downstream devices (e.g., cameras, network telephones, and/or network printers), in other embodiments, the switch 556 may have less than forty-eight downstream ports or more than forty-eight downstream ports. As depicted in FIG. 5, the switch 556 is connected to the at least one DS 552 through a wired connection, for example, at port form-factor pluggable (SFP)-1 of the switch 556. However, the upstream device to which the switch 556 is connected is not limited the DS 552.

In addition, the number of upstream network devices that may be connected to the switch is not limited to the example shown in FIG. 5. Although the switch 556 is shown in FIG. 5 as having four ports for connecting to upstream devices, in other embodiments, the switch 556 may have less than four upstream ports or more than four upstream ports.

In the embodiment depicted in FIG. 5, network devices (e.g., the network devices 504-1, 504-2, 504-3) can be plugged into any port (e.g., port 1 to port 48) of the switch 556. The switch 556 does not need or has a specific port configuration for different devices. In some embodiments, network traffic from a wired device (e.g., the network device 504-1, 504-2, or 504-3) is tunneled to the at least one HE 554. In some embodiments, at least one of a security operation and a network segmentation operation is conducted through one or more tunnels. In some embodiments, a tunnel (e.g., a Generic Routing Encapsulation (GRE) tunnel and/or a VXLAN) is created from each port of the switch 556. In some embodiments, a specific tunnel (e.g., a GRE tunnel and/or a VXLAN) is created between each port of the switch 556 and the at least one HE 554. In an embodiment, no tunnel is shared by multiple (two or more ports) of the switch 556. For example, a first tunnel (e.g., a GRE tunnel and/or a VXLAN) 570-1 is established between port 4 of the switch 556 and the at least one HE 554, a second tunnel (e.g., a GRE tunnel and/or a VXLAN) 570-2 is established between port 28 of the switch 556 and the at least one HE 554, and a third tunnel (e.g., a GRE tunnel and/or a VXLAN) 570-3 is established between port 44 of the switch 556 and the at least one HE 554. In some embodiments, at least one of a security operation (e.g., a device authentication operation or a verification operation, for example, by checking or matching the wired device with entries in a network segmentation database) and a network segmentation operation is conducted through the tunnel 570-1, 570-2, 570-3.

In some embodiments, device authentication is performed, e.g., by the authentication server (e.g., a RADIUS server) 540 and/or the cloud server 502. In some embodiments, when a wired device (e.g., the network device 504-1, 504-2, or 504-3) supports an authentication protocol or standard (e.g., an IEEE 802.1X protocol or standard), the at least one HE 554 communicates with the authentication server 540 (e.g., a RADIUS server) for device authentication when the wired device is connected to a port (e.g., port 4, port 28 or port 44) of the switch 556. In an embodiment, if device authentication is successful (e.g., the authentication server 540 (e.g., a RADIUS server) determines that the wired device has a corresponding access privilege, e.g., in response to an authentication request from the wired device and/or the at least one HE 554), the authentication server 540 (e.g., a RADIUS server) provides a network segment name parameter, which may be included in a vendor specific attribute, for example, to the at least one HE 554. In some embodiments, if the segment name matches a previously configured network segment name (e.g., for the wired device or a user of the wired device), the wired device or a user of the wired device is assigned to the corresponding network segment having the previously configured network segment name, for example, by the at least one HE 554. The at least one HE 554 may act as a DHCP relay to relay data packets to the DHCP server 542.

In some embodiments, a wired device (e.g., the network device 504-1, 504-2, or 504-3) does not support an authentication protocol or standard (e.g., an IEEE 802.1X protocol or standard), the at least one HE 554 communicates with the cloud server 502 to determine whether the wired device has a corresponding access privilege, when the wired device is connected to a port (e.g., port 4, port 28 or port 44) of the switch 556. In some embodiments, the at least one HE 554 determines whether a network administrator (e.g., a human operator or a computer) authorizes a network address (e.g., the Media Access Control (MAC) address) of the wired device and has previously assigned a network segment to the wired device. If a network administrator (e.g., a human operator or a computer) authorizes a network address (e.g., the MAC address) of the wired device and has previously assigned a network segment to the wired device, the wired device is placed into that network segment, by, for example, at least one HE 554. In some embodiments, a human operator enters the MAC address or organizationally unique identifier (OUI) of the wired device, defines a network segment name, and allows or do not allow the wired device to be placed into a corresponding network segment.

Compared with network segmentation techniques in which a physical switch is configured with virtual local area networks (VLANs) on ports of the physical switch, the switch 556 does not need or has a specific port configuration for different network devices. In network segmentation techniques in which a physical switch is configured with VLANs on ports of the physical switch, network devices have to be plugged into the right wired ports of the physical switch that are mapped to the appropriate VLANs. In the embodiment depicted in FIG. 5, network devices (e.g., the network devices 504-1, 504-2, 504-3) can be plugged into any port (e.g., port 1 to port 48) of the switch 556 and nevertheless receive a corresponding network configuration (e.g., a network segmentation configuration (i.e., successfully be placed into a correspond network segment)). Because network traffic can be tunneled between network devices and the at least one HE 554, network ports of the switch 556 do not need to be configured for corresponding VLANs. Consequently, there is no restriction as to which network port a network device must be plugged into, in order to receive a corresponding network segmentation configuration. Because network devices can be plugged into any available network port of the switch 556 while still being placed into a corresponding network segment, network deployment efficiency can be improved and network deployment mistakes can be reduced.

Figure 6:
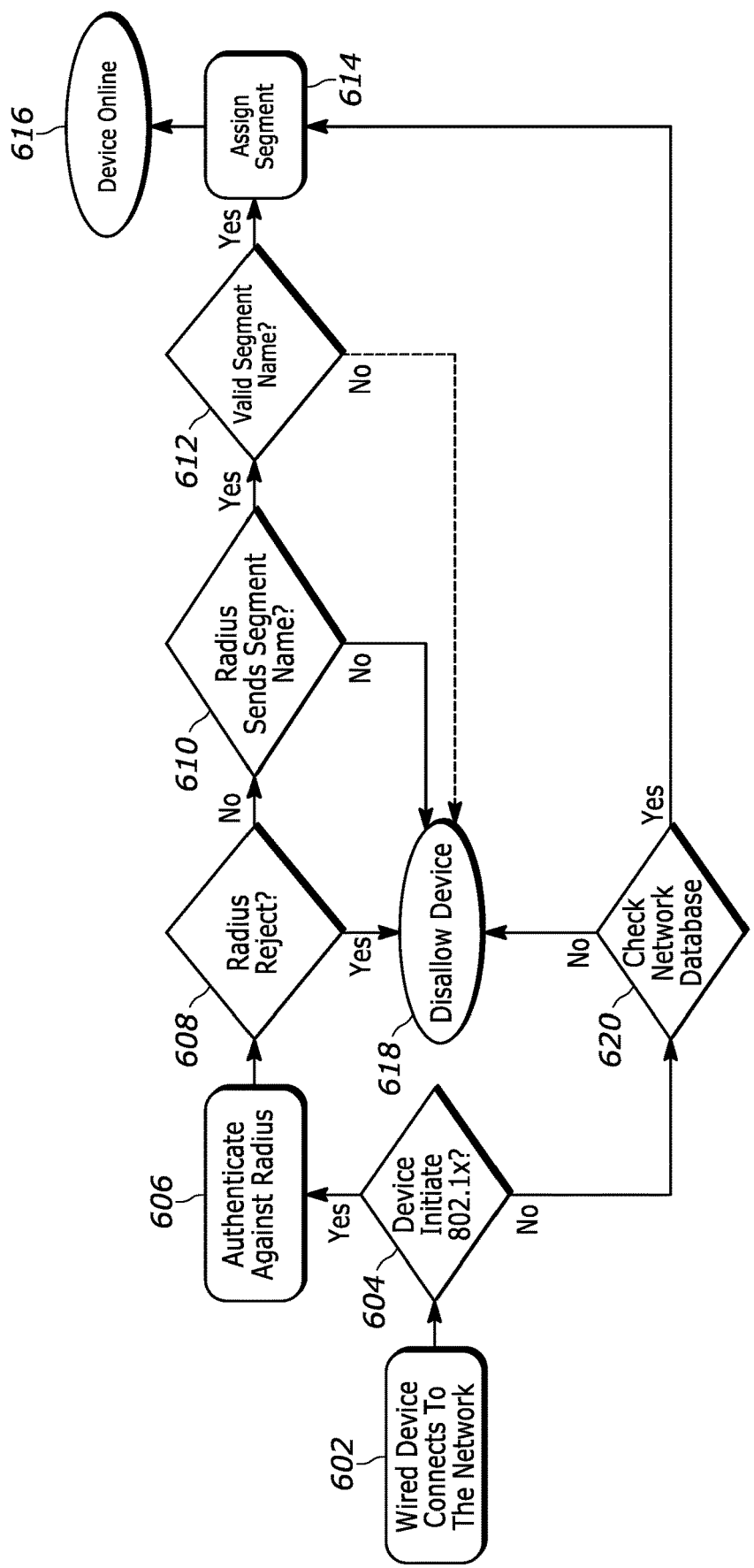
FIG. 6 is a flow chart that illustrates an exemplary network segmentation operation that can be performed in the communications system depicted in FIG. 1.

FIG. 6 is a flow chart that illustrates an exemplary network segmentation operation that can be performed in the communications system 100 depicted in FIG. 1. In the exemplary network segmentation operation, a network segmentation algorithm is implemented to place a wired device (e.g., the network device 504-1, 504-2, or 504-3) into a corresponding network segment of a network (e.g., the network 150 depicted in FIG. 1) and is executable in the communications system 100. At step 602, a wired device (e.g., the network device 504-1, 504-2, or 504-3) is connected to a network (e.g., the network 150 depicted in FIG. 1), for example, by plugging the wired device into a port of a switch in the network 150 depicted in FIG. 1 (e.g., the ASs 356-1, 356-2, 356-3, 356-4, 356-5, 356-6, 356-7, 356-8 depicted in FIG. 3 and/or the switch 556 depicted in FIG. 5). At step 604, a determination regarding whether the wired device supports an authentication protocol or standard (e.g., an IEEE 802.1X protocol or standard) is made, for example, by the cloud server 102 depicted in FIG. 1.

If/when it is determined that the wired device supports an authentication protocol or standard (e.g., an IEEE 802.1X protocol or standard), the wired device is authenticated by an authentication server (e.g., a RADIUS server) at step 606, for example, by sending an authentication request to the authentication server. The authentication server may be the same as or similar to the cloud server 102 depicted in FIG. 1 and/or the authentication server 540 (e.g., a RADIUS server) depicted in FIG. 5. The authentication server (e.g., a RADIUS server) may reject or allow the authentication request of the wired device at step 608. If/when the authentication server (e.g., a RADIUS server) rejects the authentication request of the wired device at step 608, the wired device is not allowed (e.g., by the at least one HE 554 depicted in FIG. 5) to join the network 150 and receive a network segmentation configuration. If/when the authentication server (e.g., a RADIUS server) does not reject the authentication request of the wired device at step 608, it is determined (e.g., by the at least one HE 554 depicted in FIG. 5) whether or not the authentication server (e.g., a RADIUS server) sends a network segment name for the wired device at step 610. If/when it is determined that the authentication server (e.g., a RADIUS server) does not send a network segment name for the wired device, the wired device is not allowed to join the network and receive a network segmentation configuration at step 618. If/when it is determined (e.g., by the at least one HE 554 depicted in FIG. 5) that the authentication server (e.g., a RADIUS server) sends a network segment name of the wired device, it is determined whether or not the received network segment name for the wired device is valid at step 612. If/when it is determined (e.g., by the at least one HE 554 depicted in FIG. 5) that the received network segment name for the wired device is valid, the wired device is assigned to a corresponding network segment of the received network segment name at step 614 and the wired device is considered to be online at step 616. If/when it is determined that the received network segment name for the wired device is not valid, the wired device may be not allowed to join the network and receive a network segmentation configuration at step 618.

Returning back to step 604, if/when it is determined that the wired device does not support an authentication protocol or standard (e.g., an IEEE 802.1X protocol or standard), the wired device is authenticated (e.g., by the cloud server 102 depicted in FIG. 1) at step 620, for example, by checking a network segmentation database. If/when it is determined that the wired device matches an entry within the network segmentation database, the wired device is assigned to a corresponding network segment of the network at step 614 and the wired device is considered to be online at step 616. If/when it is determined that the wired device does not match any entry within the network segmentation database, the wired device is not allowed to join the network and receive a network segmentation configuration, for example, by the authentication server (e.g., a RADIUS server) at step 618.

Figure 7:
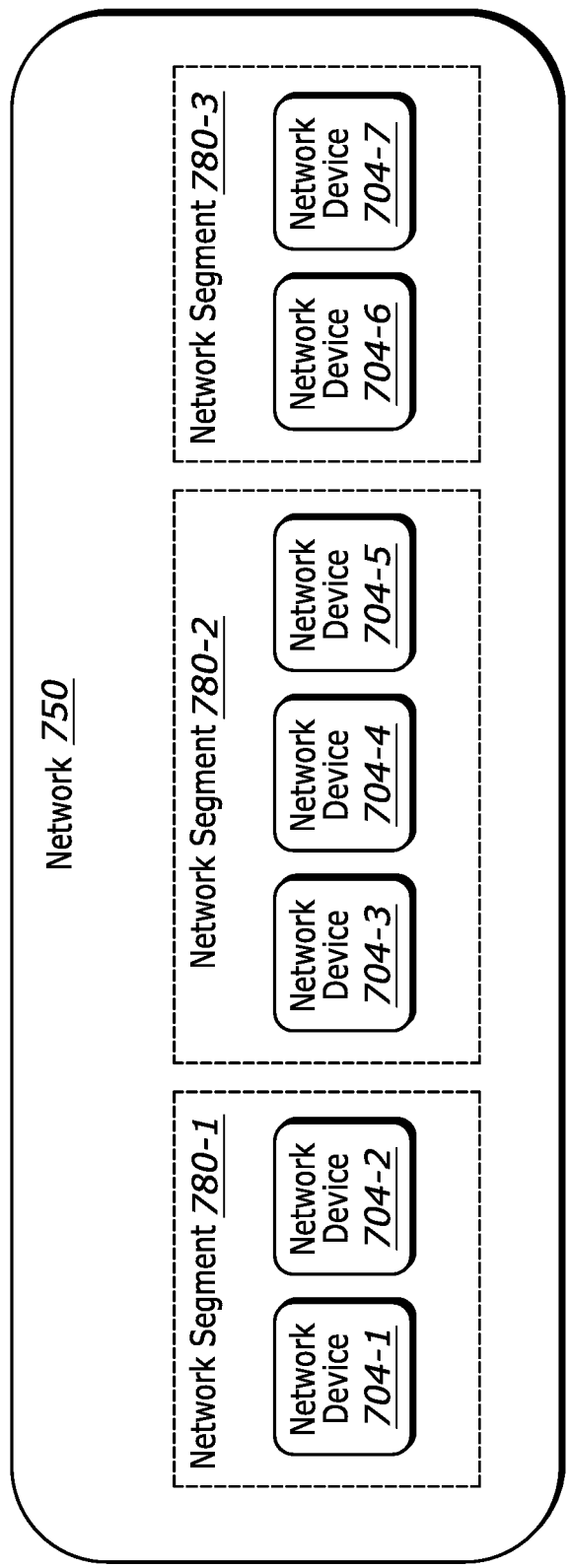
FIG. 7 depicts some exemplary network segments of a network, which may be result from the network segmentation operation depicted in FIG. 6.

FIG. 7 depicts some exemplary network segments 780-1, 780-2, 780-3 of a network 750, which may be result from the network segmentation operation depicted in FIG. 6. In the network 750 depicted in FIG. 7, the network segment 780-1 includes network devices 704-1, 704-2, the network segment 780-2 includes network devices 704-3, 704-4, 704-5, and the network segment 780-3 includes network devices 704-6, 704-7. The network segments 780-1, 780-2, 780-3 can be used to improve network performance and/or or enhance network security. In some embodiments, each of the network segments 780-1, 780-2, 780-3 is a different subnet of the network 750 having a unique subnet mask. Each segment or subnet 780-1, 780-2, or 780-3 of the network 750 can act as its own small network, which allows flow of traffic between subnets to be controlled based on granular policies or rules. However, the number of network segments that can be included in a network is not limited to the examples shown in FIG. 7. In addition, the number of network devices that can be included in a network segment is not limited to the examples shown in FIG. 7.

Figure 8:
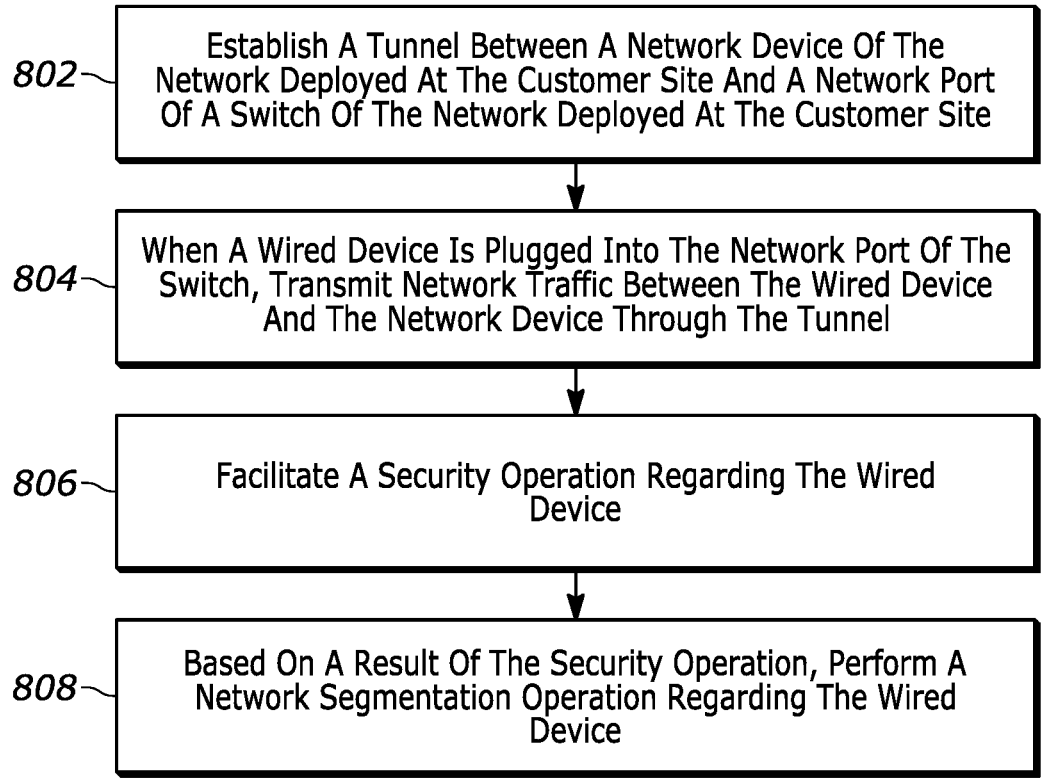
FIG. 8 is a process flow diagram of a method for network segmentation of a network deployed at a customer site accordance to an embodiment of the invention.

FIG. 8 is a process flow diagram of a method for network segmentation of a network deployed at a customer site accordance to an embodiment of the invention. According to the method, at block 802, a tunnel is established between a network device of the network deployed at the customer site and a network port of a switch of the network deployed at the customer site. At block 804, when a wired device is plugged into the network port of the switch, network traffic is transmitted between the wired device and the network device through the tunnel. At block 806, a security operation regarding the wired device is facilitated. At block 808, based on a result of the security operation, a network segmentation operation regarding the wired device is performed. In some embodiments, at least one of the security operation and the network segmentation operation is conducted through the tunnel. In some embodiments, the tunnel includes a GRE tunnel and/or a VXLAN. In some embodiments, establishing the tunnel between the network device of the network deployed at the customer site and the network port of the switch of the network deployed at the customer site includes establishing tunnels between the network device and a network port of the switch, where the tunnels are separate from each other. In some embodiments, no tunnel is shared by multiple ports of the switch. In some embodiments, facilitating the security operation regarding the wired device includes facilitating an authentication operation regarding the wired device through the network device. In some embodiments, facilitating the authentication operation regarding the wired device through the network device includes authenticating the wired device with an authentication server through the network device. In some embodiments, based on the result of the security operation, performing the network segmentation operation regarding the wired device includes when the authentication server rejects an authentication request of the wired device, not allowing the wired device to join the network and receive a network segmentation configuration. In some embodiments, based on the result of the security operation, performing the network segmentation operation regarding the wired device includes when the authentication server does not reject an authentication request of the wired device, allowing the wired device to join the network and receive a network segmentation configuration. In some embodiments, facilitating the authentication operation regarding the wired device through the network device further includes when the authentication server does not reject an authentication request of the wired device, determining whether or not the authentication server sends a network segment name for the wired device. In some embodiments, based on the result of the security operation, performing the network segmentation operation regarding the wired device includes when it is determined that the authentication server does not send the network segment name for the wired device, not allowing the wired device to join the network and receive a network segmentation configuration. In some embodiments, performing the authentication operation regarding the wired device through the network device further includes when it is determined that the authentication server sends the network segment name for the wired device, determining whether or not the network segment name for the wired device is valid. In some embodiments, based on the result of the security operation, performing the network segmentation operation regarding the wired device includes when it is determined that the network segment name for the wired device is valid, assigning the wired device to a network segment of the network deployed at the customer site that corresponds to the network segment name. In some embodiments, the wired device supports an authentication protocol or standard. In some embodiments, facilitating the authentication operation regarding the wired device through the network device includes checking the wired device against a network segmentation database. In some embodiments, based on the result of the security operation, performing the network segmentation operation regarding the wired device includes when it is determined that the wired device matches an entry within the network segmentation database, assigning the wired device to a corresponding network segment of the network deployed at the customer site, and when it is determined that the wired device does not match any entry within the network segmentation database, not allowing the wired device to join the network and receive a network segmentation configuration. In some embodiments, the wired device does not support any authentication protocol or standard. In some embodiments, the network device includes a HE or a gateway device. The network device may be similar to, the same as, or a component of the HEs 354-1, 354-2 depicted in FIG. 3, the at least one HE 554 depicted in FIG. 5. The wired device may be similar to, the same as, or a component of the network devices 104-1, . . . , 104-N depicted in FIG. 1, the network device 204 depicted in FIG. 2, the network devices 504-1, 504-2, 504-3 depicted in FIG. 1, and/or the network devices 704-1, 704-2, 704-3, 704-4, 704-5, 704-6, 704-7 depicted in FIG. 7. The network may be similar to, the same as, or a component of the network 150 depicted in FIG. 1 and/or the network 750 depicted in FIG. 7. The customer site may be similar to, the same as, or a component of the customer site 114 depicted in FIG. 1.

Figure 9:
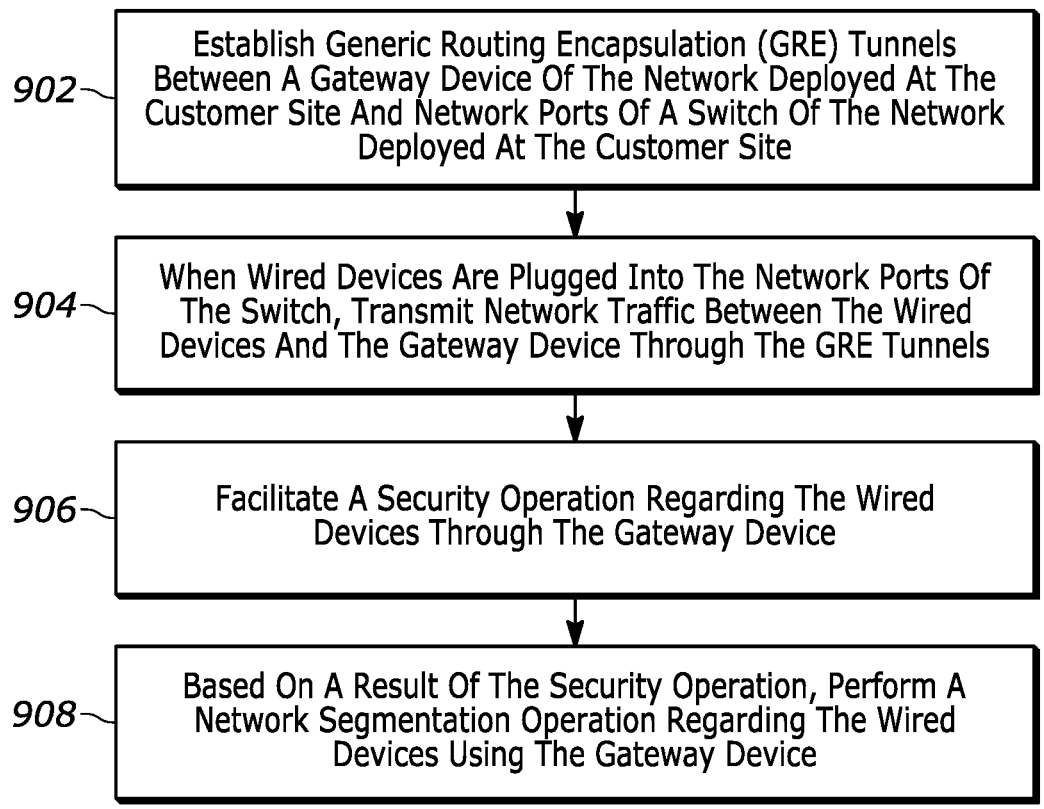
FIG. 9 is a process flow diagram of a method for network segmentation of a network deployed at a customer site accordance to another embodiment of the invention.

FIG. 9 is a process flow diagram of a method for network segmentation of a network deployed at a customer site accordance to another embodiment of the invention. According to the method, at block 902, GRE tunnels are established between a gateway device of the network deployed at the customer site and network ports of a switch of the network deployed at the customer site. At block 904, when wired devices are plugged into the network ports of the switch, network traffic is transmitted between the wired devices and the gateway device through the GRE tunnels. At block 906, a security operation regarding the wired devices is facilitated through the gateway device. At block 908, based on a result of the security operation, a network segmentation operation regarding the wired devices is performed using the gateway device. In some embodiments, at least one of the security operation and the network segmentation operation is conducted through the GRE tunnels. The network device may be similar to, the same as, or a component of the HEs 354-1, 354-2 depicted in FIG. 3, the at least one HE 554 depicted in FIG. 5. The wired device may be similar to, the same as, or a component of the network devices 104-1, . . . , 104-N depicted in FIG. 1, the network device 204 depicted in FIG. 2, the network devices 504-1, 504-2, 504-3 depicted in FIG. 1, and/or the network devices 704-1, 704-2, 704-3, 704-4, 704-5, 704-6, 704-7 depicted in FIG. 7. The network may be similar to, the same as, or a component of the network 150 depicted in FIG. 1 and/or the network 750 depicted in FIG. 7. The customer site may be similar to, the same as, or a component of the customer site 114 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for network segmentation of a network deployed at a customer site, the method comprising:
 establishing a tunnel between a network device of the network deployed at the customer site and a network port of a switch of the network deployed at the customer site when a wired device is plugged into the network port of the switch;
 transmitting network traffic between the wired device and the network device through the tunnel to verify the wired device; and
 performing a network segmentation operation regarding the wired device once the wired device is verified,
 wherein the network device is a head end (HE) device and the switch is an access switch (AS), and the method further comprising implementing an authentication operation regarding the wired device through the tunnel that is established between the HE and the network port of the AS.

2. The method of claim 1, wherein the tunnel comprises a Generic Routing Encapsulation (GRE) tunnel.

3. The method of claim 1, wherein the tunnel comprises a Virtual Extensible Local Area Network (VXLAN) tunnel.

4. The method of claim 1, wherein the tunnel comprises a Network Virtualization using Generic Routing Encapsulation (GRE) tunnel.

5. The method of claim 1, wherein the tunnel comprises an IP Security (IP-Sec) tunnel.

6. The method of claim 1, wherein the wired device can be plugged into any available port of the switch.

7. The method of claim 1, wherein establishing the tunnel between the network device of the network deployed at the customer site and the network port of the switch of the network deployed at the customer site comprises establishing a plurality of port-specific tunnels between the network device and a plurality of network ports of the switch, wherein the port-specific tunnels are separate from each other.

8. The method of claim 1, wherein establishing the tunnel between the network device of the network deployed at the customer site and the network port of the switch of the network deployed at the customer site comprises establishing a plurality of tunnels between the network device and a plurality of network ports of the switch, wherein the tunnels are separate from each other.

9. The method of claim 8, wherein no tunnel is shared by multiple ports of the switch.

10. The method of claim 1, further comprising implementing an authentication operation regarding the wired device through the tunnel that is established between the network device and the network port of the switch.

11. The method of claim 1, wherein implementing the authentication operation regarding the wired device comprises accessing authentication server through the tunnel that is established between the HE and the network port of the AS.

12. A system for network segmentation of a network deployed at a customer site, the system comprising:
    memory; and
    one or more processors configured to:
        establish a tunnel between a network device of the network deployed at the customer site and a network port of a switch of the network deployed at the customer site when a wired device is plugged into the network port of the switch;
        transmit network traffic between the wired device and the network device through the tunnel to verify the wired device; and
        perform a network segmentation operation regarding the wired device once the wired device is verified,
    wherein the network device is a head end (HE) device and the switch is an access switch (AS), and the one or more processors are further configured to implement an authentication operation regarding the wired device through the tunnel that is established between the HE and the network port of the AS.

13. A method for network segmentation of a network deployed at a customer site, the method comprising:
    establishing a plurality of Generic Routing Encapsulation (GRE) tunnels between a gateway device of the network deployed at the customer site and a plurality of network ports of a switch of the network deployed at the customer site;
    when a plurality of wired devices are plugged into the network ports of the switch, transmitting network traffic between the wired devices and the gateway device through the GRE tunnels;
    facilitating a security operation regarding the wired devices through the gateway device; and
    based on a result of the security operation, performing a network segmentation operation regarding the wired devices using the gateway device,
    wherein the gateway device is a head end (HE) device and the switch is an access switch (AS), and the method further comprising implementing an authentication operation regarding the wired devices through the tunnels that are established between the HE and the network port of the AS.

* * * * *